Oct. 16, 1962  E. R. BERNSON  3,058,787
HIGH SPEED SHAFT BEARING LUBRICATION
Filed June 22, 1959  2 Sheets-Sheet 1

INVENTOR.
ELMER R. BERNSON
BY
Fryer and Johnson
ATTORNEYS

INVENTOR.
ELMER R. BERNSON
BY
*Fryer and Johnson*
ATTORNEYS

United States Patent Office 3,058,787
Patented Oct. 16, 1962

3,058,787
HIGH SPEED SHAFT BEARING LUBRICATION
Elmer R. Bernson, Washington, Ill., assignor to Caterpillar Tractor Co., Peoria, Ill., a corporation of California
Filed June 22, 1959, Ser. No. 822,130
7 Claims. (Cl. 308—121)

This invention relates to improvements in lubricated bearings utilized in the support of shafts which rotate at high speed.

In rotating shaft mechanisms which are supported by axially spaced sleeve-type bearings, particularly when the speed of rotation is in the order of 40,000 to 50,000 r.p.m. or higher, the static and dynamic balance of the rotating mass is extremely critical.

It has been discovered that mechanisms with shafts rotated at very high speeds in sleeve-type bearings, lubricated by a film of oil which occupies the clearance or space between the shaft and sleeve, unusual vibrations are set up due to the fact that the shaft has a pumping effect on the oil which increases its pressure at some points more than at others around the circumference of the shaft. This unequal balance of lubricant pressure moves or bends the shaft to a position slightly eccentric with respect to the sleeve and self-excited vibrations of undesirable magnitude are set up. The efficiency of rotating mechanisms subjected to self-excited vibrations is reduced considerably due to the energy absorbed by such vibrations. These vibrations which vary somewhat in their nature under different circumstances have been variously termed "oil whip," "shaft whip," and "oil whirl."

Attempts have been made to correct these phenomena by employing a floating sleeve bearing so that the shaft rotates with respect to the sleeve and the sleeve itself is free to rotate in its supporting housing. Thus distributing the total bearing clearance required and also reducing the relative speed between any two of the three parts which include the shaft, the sleeve and the housing and, while structures of this kind have been effective in some cases particularly at relatively lower speeds, they are inadequate for most high speed operations.

Other attempts have been made along the line of interrupting the bearing surface so that gaps or recesses are provided throughout the circumference of the sleeve, one form being typified by the so-called "Kingsbury" bearing in which the bearing surface of the sleeve is made up of separate pivoted arcuate segments. Such efforts have proven satisfactory in many instances but they have the disadvantage that they are extremely costly and reduce the load bearing surface of the bearing so that the overall size of the bearing must be increased over that normally used for any specific application.

Another method employed in attempting to overcome vibrations such as caused by oil whip has been to provide a groove or grooves on the inside of the bearing sleeve in communication with the oil film between the sleeve and the shaft and extending only partially around the sleeve. This groove known as a blocked groove or interrupted groove has also proven satisfactory under certain conditions.

The present invention resides in the discovery of a certain combination of the floating sleeve hereinabove referred to and the blocked groove method described and produces better results in overcoming oil whip than either of the previously known means and produces results superior even to what might be expected from such a combination. It is, therefore, the object of the present invention to provide a bearing structure which overcomes those phenomena of vibration which occur in high speed sleeve-type bearings and to provide such a structure which is relatively inexpensive and does not require undue enlargement of the bearing as a whole.

Further objects and advantages of the invention and the manner in which it is carried into practice are made apparent in the accompanying drawings to which reference is made in the following specification.

Figure 1:
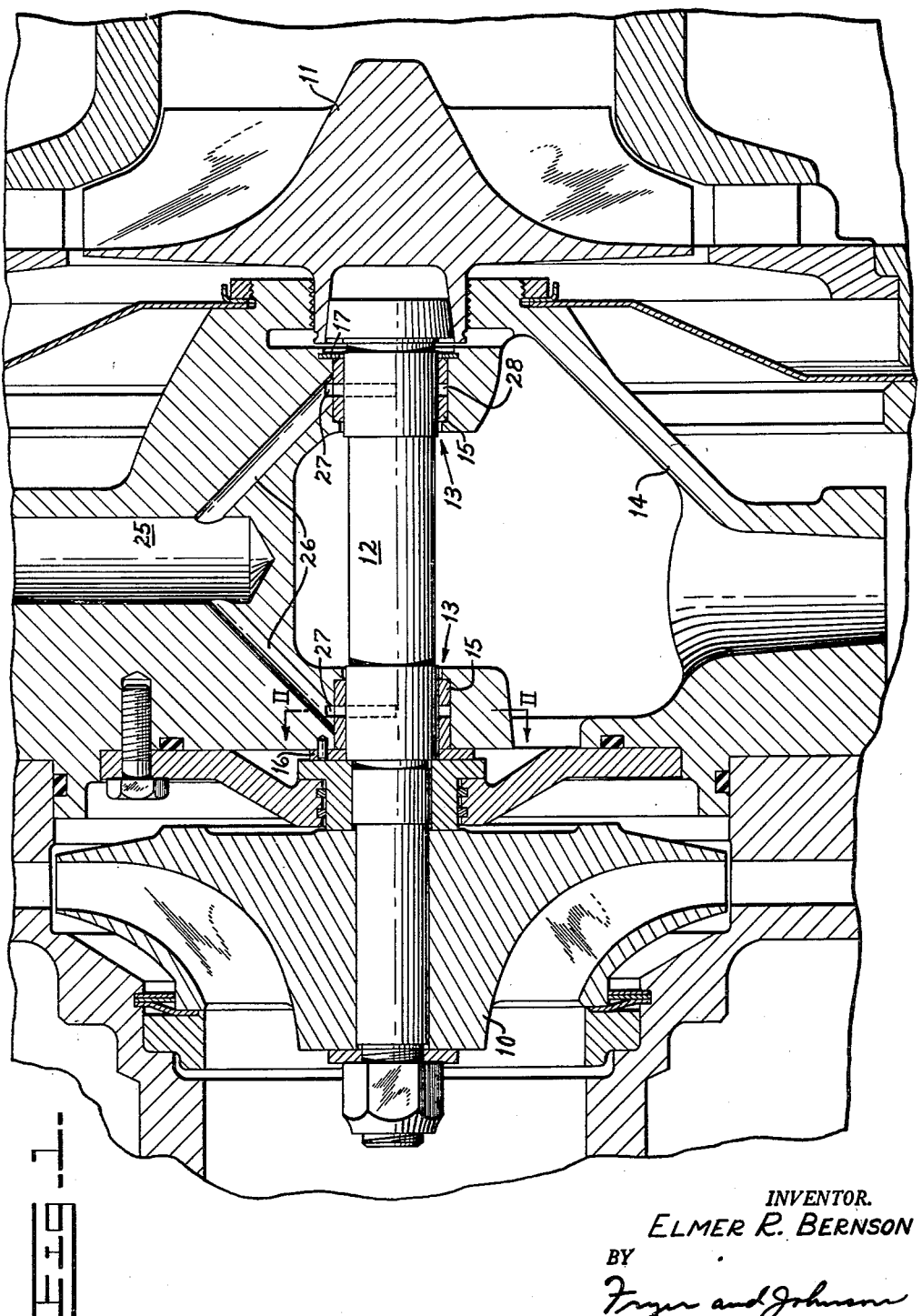
FIG. 1 is a view in horizontal cross section taken through the central part of a turbocharger and illustrating the rotor thereof on a shaft supported in bearings constructed in accordance with the present invention.

The portion of the turbocharger illustrated in FIG. 1 includes a compressor wheel 10 and a turbine wheel 11 both carried by and fixed against rotation on a shaft 12. The shaft is supported for high speed rotation in bearings generally indicated at 13 which are supported in spaced bores in a portion of the housing 14 of the turbocharger. The bearings 13 include floating sleeves 15 retained against sliding axially out of their respective bores, one by a thrust washer 16 and the other by a snap ring 17.

Figure 2:
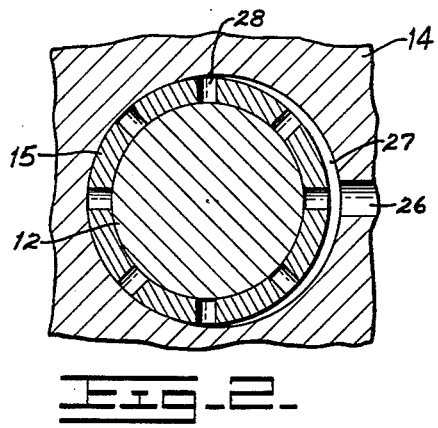
FIG. 2 is a fragmentary sectional view through one of the bearings taken on the line II—II of FIG. 1.

Lubricant is applied to the bearings through a lubricant supply passage 25 in the housing 14 and connecting passages 26 which lead to the bearing bores. Each of the passages 26 communicates with an interrupted or blocked groove 27 formed internally of the bearing bores and so named because it extends less than the full distance around the shaft or, as illustrated for example in FIG. 2, approximately one-half the distance. The sleeve 15 which is floating or capable of rotation with respect to the shaft, as well as with respect to the housing, is provided with peripherally spaced perforations 28 arranged to register with the blocked groove 27 and permits free passage of oil inwardly to the surface of the shaft.

In practice, the clearance or radial diametral space between the shaft 12 and the sleeve 15 permits rotation of the shaft in the sleeve and provides space for an adequate oil film. A somewhat greater clearance is provided between the outside of the sleeve 15 and the bore in which it is received. This greater clearance allows a certain amount of radial displacement of the shaft permitting slight eccentricity which is likely to occur in a slightly unbalanced mechanism without producing damage. The rotation of the sleeve in its bore cannot cause an oil pump effect or variation of oil pressure sufficient to produce oil whip or whirl previously referred to due to the existence of the groove 27 because unbalance of oil pressure which tends to be created between the relatively rotating parts is eliminated by being relieved into the interrupted groove. It has been found that the relationship between the clearance between the shaft and sleeve and between the sleeve and housing bore is critical and that the ratio of the clearance outside the sleeve to that inside the sleeve should be not less than two to one. For example in the actual turbocharger herein illustrated, the space between the sleeve and shaft is in the order of .0015 to .003 inch and the clearance between the outside of the sleeve and the bore is from .003 to .006 inch.

Figure 3:
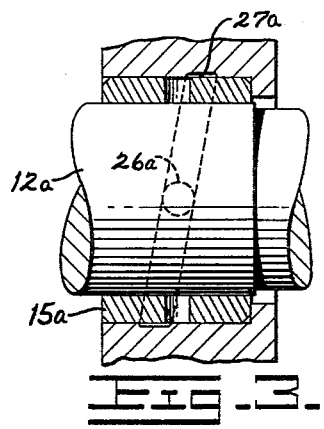
FIG. 3 is a fragmentary sectional view taken longitudinally of the shaft illustrating a modified form of the invention.

A modification of the invention is illustrated in FIG. 3 wherein the shaft is shown at 12a as identical with the shaft 12 and the sleeve 15a identical with the sleeve 15. This view is taken on a horizontal plane looking upwardly so that the full length of the blocked or interrupted groove is shown in dotted lines at 27a with the oil passage indicated at 26a. In this modification the interrupted groove is disposed at an angle to a plane which is normal to the axis of the shaft 9a and serves the same purpose in the same manner as the groove 27 of FIG. 2. However, this inclination of the groove 27a insures that any foreign matter entering with the oil and reaching the bearings will not cause abrasion in a restricted area which might encircle the sleeve 15a and produce an uninterrupted groove throughout the circumference of the sleeve as readily as might occur with the construction shown in FIG. 2. Such abrasion of the bores or the sleeve 15 or 15a would have the effect of extending the grooves 27 or 27a through the periphery of the entire bearing surface and would defeat the purpose of the grooves which would no longer be capable of preventing the undesirable vibration or whirl.

Figure 4:
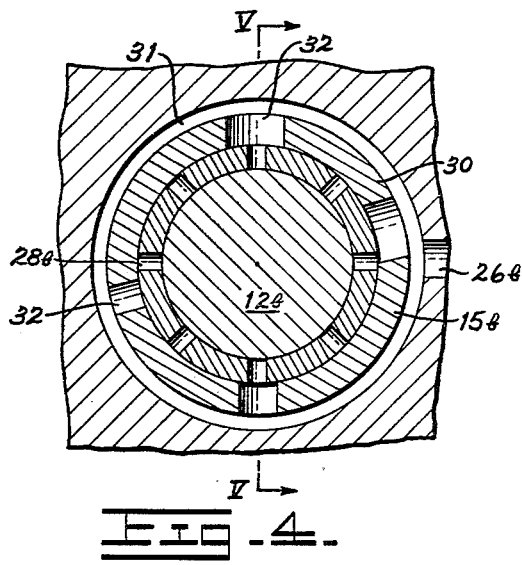
FIG. 4 is a transverse sectional view like FIG. 2 of a further modification of the invention.
Figure 5:
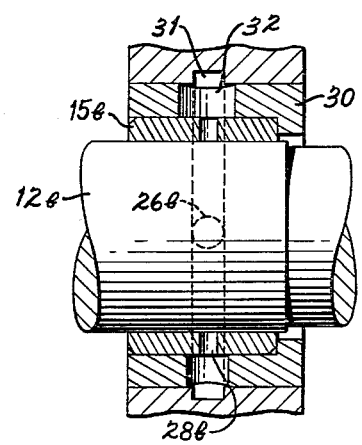
FIG. 5 is a sectional view taken on the line V—V of FIG. 4.

A further modification of the invention is illustrated in FIGS. 4 and 5 wherein a shaft 12b and sleeve 15b comparable to the previously described shaft 12 and 15. In this modification a bushing 30 is pressed or otherwise secured against rotation in the housing bore and a groove 31 in the housing bore, in communication with an oil passage 26b, completely circumscribes the bushing 30. The bushing is provided with a plurality of ports or openings such as shown at 32 preferably of different sizes and spaced from each other various distances to serve in the manner of the blocked or interrupted groove previously described in communicating oil from the passage 26b through the openings 28b in the sleeve and to the surface of the shaft, and also in preventing the accumulation of pressure areas between the sleeve and the bushing. It is important in this modification of the invention, as well as in the modifications shown in FIGS. 2 and 3, that the clearance between the bushing and sleeve and the clearance between the sleeve and shaft be maintained approximately at a two to one ratio and substantially within the dimension ranges hereinbefore set forth.

I claim:

1. A bearing member for a high speed shaft, said bearing member having a cylindrical bore therein, a single piece cylindrical floating sleeve disposed within said bore for rotation therein, a cylindrical shaft disposed within said sleeve for rotation therein and extending beyond the opposite ends of said sleeve, said sleeve having a plurality of peripherally spaced and radially extending perforations therein in communication with the periphery of said shaft and said bore, said perforations occupying a substantially minor portion of the distance between the opposite ends of said sleeve, said bearing member having a circumferential groove disposed in the bore facing the outer surface of said cylindrical sleeve, said groove being in communication with said perforations, the opposite ends of said groove terminating at points substantially equal to one-half the diameter of said sleeve, and means for directing oil to said shaft through said groove.

2. The bearing member of claim 1 wherein said groove has its midportion of substantially greater depth than the depth of its opposite ends.

3. The bearing member of claim 1 wherein said groove has a progressively increasing depth from its opposite ends to its midportion.

4. The bearing member of claim 3 wherein the inner surface of said sleeve fits the periphery of said shaft with a free rotating bearing clearance, and the outer surface of said sleeve fits within said bore with a clearance approximately twice said first mentioned clearance.

5. The bearing member of claim 3 wherein said groove has its longitudinal axis disposed at an angle of inclination to a plane normal to the axis of said shaft.

6. The bearing member of claim 4 wherein the opposite ends of said groove are substantially vertical and its opposite ends terminate respectively at the highest and lowest points of said shaft.

7. In combination, a high speed turbine including a shaft connected to said turbine for rotation therewith, a bearing member having a cylindrical bore therein, a cylindrical floating sleeve disposed within said bore, said shaft extending through said sleeve, said sleeve having a plurality of peripherally spaced and radially extending perforations therein, in communication with the periphery of said shaft and said bore, said perforations occupying a substantially minor portion of the distance between the opposite ends of said sleeve, a circumferential groove disposed in the bore facing the outer surface of said cylindrical sleeve, said groove being in communication with said perforations, the opposite ends of said groove terminating at points substantially equal to one-half the diameter of said sleeve, and means for directing oil to said shaft through said groove.

References Cited in the file of this patent

UNITED STATES PATENTS

| 292,994 | Darling | Feb. 5, 1884 |
| 1,354,852 | Schneider | Oct. 5, 1920 |
| 1,359,904 | Mallory | Nov. 23, 1920 |
| 1,562,644 | Jones | Nov. 24, 1925 |
| 1,643,760 | Allen | Sept. 27, 1927 |
| 1,735,258 | Melley et al. | Nov. 12, 1929 |
| 2,418,901 | Read | Apr. 15, 1947 |
| 2,532,795 | Underwood et al. | Dec. 5, 1950 |

FOREIGN PATENTS

| 1,063,031 | France | Dec. 16, 1953 |